Patented Apr. 3, 1951

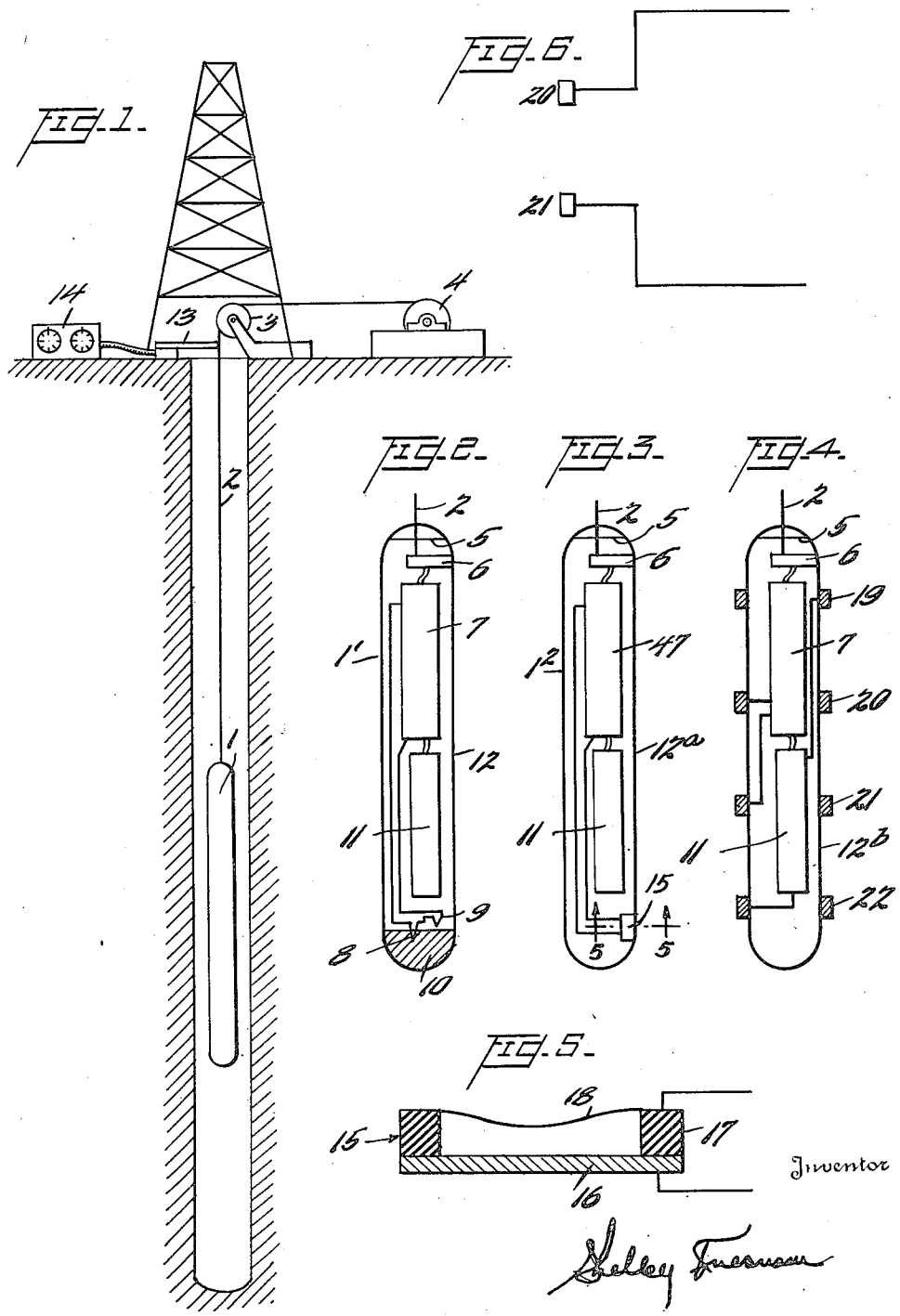

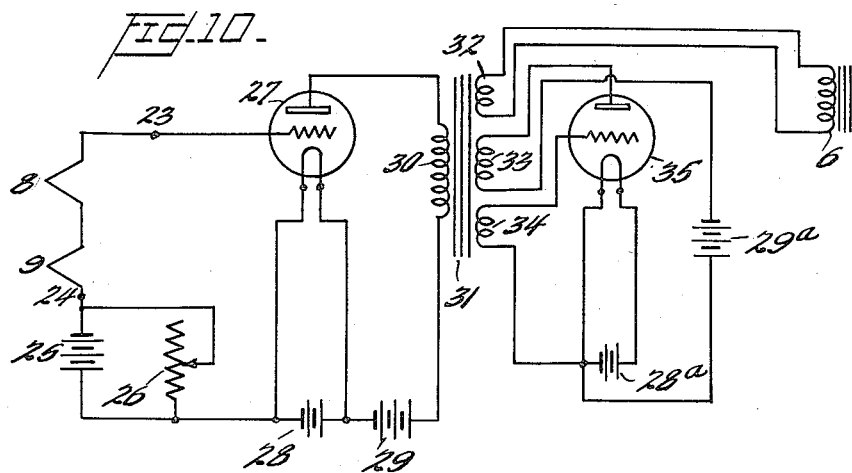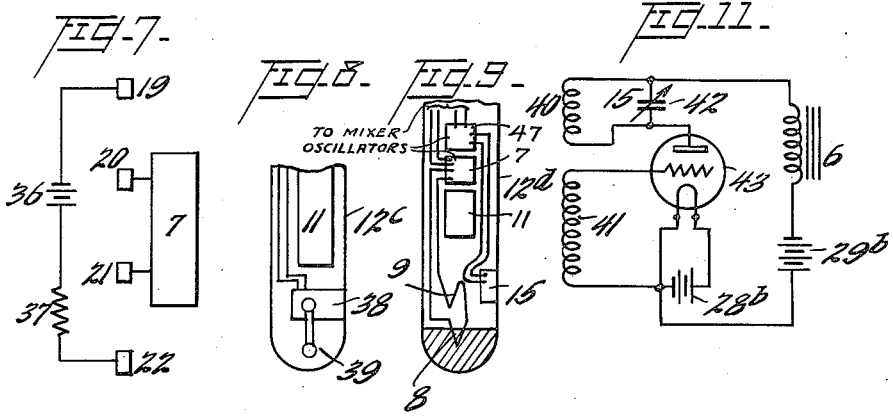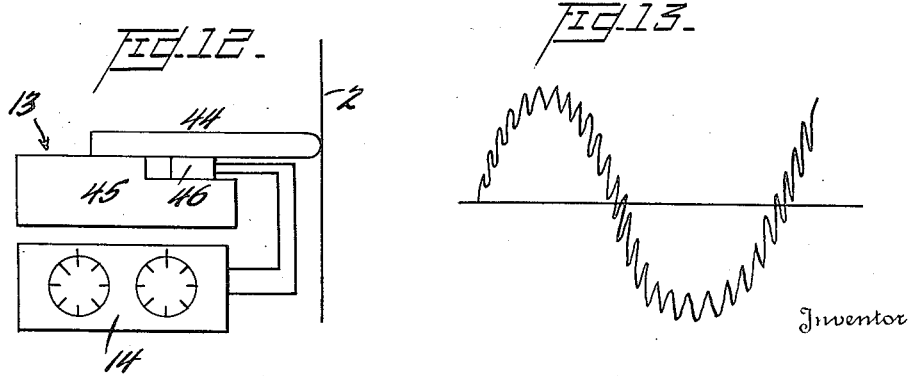

2,547,876

UNITED STATES PATENT OFFICE 2,547,876

APPARATUS FOR INVESTIGATING A PLURALITY OF PHYSICAL VALUES IN BOREHOLES

Shelley Krasnow, Arlington County, Va., assignor to Schlumberger Well Surveying Corporation, Houston, Tex., a corporation of Delaware Application January 5, 1944, Serial No. 517,144

2 Claims. (Cl. 177—352)

This invention relates to a method and apparatus for making physical measurements in inaccessible locations, and has particular reference to a method and apparatus for making physical measurements in deep bore holes.

An object of the invention is to provide a method and apparatus such that a knowledge of physical conditions at a site may be gained at a considerable distance from the site without the intermediacy of any electric cables. In the particular application mentioned, a knowledge may be gained at the surface of the earth of physical conditions many thousands of feet below the surface.

A further object of the invention is to provide an apparatus and method such that measurements of more than one physical quantity may be made in rapid succession.

A still further object of the invention is to provide an apparatus and method such that two or more physical quantities may be measured simultaneously.

Reference is had to the accompanying drawings in which:

Figure 1 is a schematic view showing the apparatus applied to taking physical measurements in a bore hole.

Figure 2 shows a schematic view of the sound generator used for measuring temperature.

Figure 3 shows a schematic view of a corresponding generator for measuring pressure.

Figure 4 shows a schematic view of a corresponding generator for measuring electrical properties.

Figure 5 shows an enlarged view of the element sensitive to pressure, used in the generator shown in Figure 3, the section being taken across the lines 5—5 in Figure 3.

Figure 6 shows a partial schematic view of the circuit used in the generator shown in Figure 4.

Figure 7 shows a further schematic view of the circuit used in the generator shown in Figure 4.

Figure 8 shows a schematic partial view of a generator for measuring inclination.

Figure 9 shows a schematic partial view of a generator for the simultaneous or successive measurement of temperature and pressure.

Figure 10 shows the wiring diagram of the circuit used in measurement of temperature.

Figure 11 shows the wiring diagram of the circuit used for measuring pressure.

Figure 12 shows schematically the arrangement for detecting vibrations.

Figure 13 shows a modulated wave form suitable for the simultaneous measurement of two physical quantities.

The measurement of certain physical quantities such as pressure and temperature in bore holes, has proved to be of great practical importance. A number of methods have been devised for obtaining these measurements. One method, in common use, is to send down a cartridge containing an apparatus for recording graphically the change in physical conditions as the apparatus is lowered, or in a simpler form, to record the value of a physical quantity at a single depth. Another method much used is to convert the physical quantity being measured into an electrical quantity (if the quantity being measured is not itself, in fact, electrical) and by means of electric cables extending upward from the measuring element make possible the indirect measurement of the physical quantity at the surface.

A disadvantage of the first method named is that it does not permit a ready observation of the quantity being measured while the measurement is being taken. A disadvantage of the second method is that a heavy and expensive electric cable must be used. In some bore holes, mud, salt water, and crude oil exist at different levels. The problem of providing a cable insulation which will withstand all of these, and at the same time be resistant to abrasion, is a difficult one. Further still, the best conductors of electricity are not mechanically strong, so that a high strength wire must be twisted together with the electrical conductors. The additional weight provided by the strengthening wires and insulation is such as to make the cable very much heavier than the object lowered at its end, in the case of deep bore holes.

In the instant invention, the physical quantity being measured is converted into a mechanical vibrations or into sound waves; the frequency of either of these varying as a known function of the physical quantity being measured. This can be done by providing a sound or mechanical vibration generator, which is lowered to the depth at which it is desired to take measurements. The frequency of the sound, or the frequency of the mechanical impulses is determined by the magnitude of the quantity being measured. The sound or mechanical vibration generated is conducted to a convenient site through the intermediacy of the member supporting the generator. Alternatively, the sound or mechanical vibration can be transmitted to a convenient site by means of the fluid in the vicinity or through any relatively rigid body such as the casing or drill-pipe in the bore hole. A device for detecting the sound or mechanical vibration, and for measuring its frequency, is placed at any convenient site. By the value of the frequency obtained it is possible to deduce the magnitude of the physical quantity being measured.

Referring now in detail to the drawings, 1 is a cartridge containing the apparatus for generating sound or mechanical vibrations. 2 is a supporting member which may be a wire of high strength material. The member 2 makes contact with a feeler 13 after which it passes over a pulley 3 and is wound up on a reel 4. The feeler 13 acts through the intermediacy of a vibration sensitive device, hereinafter more fully described, on a frequency measuring device 14.

If the physical quantity measured is temperature, the apparatus shown in Figure 2 is used. Here a thermo-couple 8 is exposed to the temperature in the well through a heat-conducting medium 10. The thermo-couple 9 is kept at a constant temperature and thus serves as the reference thermo-couple. Both of these couples are connected in series and also with the generator 7, the circuit employed in 7 being such that a change in applied E. M. F. will cause a change in frequency as will be later more fully described. A battery compartment 11 serves to hold the batteries which provide the energy for the generator 7. The electrical oscillations generated by the generator 7 are converted into mechanical or sound oscillations by means of a suitable loud speaker element 6. To the latter is fastened the end of the member 2. A diaphragm 5 serves to allow the transmission of the vibrations through the walls of the housing 12, and at the same time prevent the flow of fluid into the housing.

Figure 3 shows an apparatus used for measuring pressure. In this a pressure sensitive element 15 is placed adjacent an outer wall of the cartridge 12ª. The variation in pressure will cause a change in electrical constants of the element 15. This change, acting on the electrical oscillator 47, will cause a change in the frequency of current transmitted to the loud speaker element 6.

Figure 4 shows an apparatus adapted for measuring the electrical properties of the material surrounding the bore hole. In the particular modification shown, the electrical resistivity is measured by means of the "Wenner four-electrode method." The housing 12ᵇ is made of insulating material and four conducting rings, 19, 20, 21 and 22, are fastened to the outside of the housing. A current is maintained between the rings 19 and 22 as shown schematically in Figure 7. Here a battery 36 has one pole connected through the ballast resistance 37 to the ring 22, and has its other pole connected to the ring 19. The E. M. F. between rings 20 and 21, resulting from the passage of the current, is applied to the oscillator 7, as in the apparatus shown in Figure 10.

Figure 8 shows a part view of an apparatus for measuring the inclination of a bore hole. Here the position of a pendulum 39 relative to a support 38 determines an electrical constant in the circuit of a generator such as 47. Thus a change in inclination will cause a change in frequency of the oscillation emitted by the generator 47.

Figure 9 shows a part view of an apparatus for the simultaneous measurement of temperature and pressure. This is the equivalent of a combination of the elements shown in Figures 2 and 3. It is understood that the frequency change due to the temperature measuring element may be noted on the lowering of the cartridge in the bore hole, and the frequency due to the pressure measuring element noted on the raising of the cartridge. A time switch may be placed within the housing 12ᵈ so as to disconnect the elements 8 and 9 from circuit and connect the element 15 after a predetermined interval. In using such an apparatus, a predetermined interval long enough to allow lowering of the cartridge would be chosen. Thus, after the cartridge was lowered to its desired depth, temperature measurements being taken on the way, the time switch would cause the connection of the pressure measuring element and on raising the cartridge pressure would be measured. As alternative to this, pressure and temperature may be measured simultaneously by the use of a modulated mechanical or sound oscillation as will be hereinafter more fully described.

Figure 10 shows a circuit diagram for the unit shown in Figure 2. Here 8 is the measuring and 9 the reference thermocouple. 27 is a vacuum tube of conventional type. In series with its grid are the couples 8 and 9, a biasing battery 25 and balancing rheostat 26, in parallel therewith, and one end of the filament of the tube. A battery 28 serves to heat the filament, in a conventional fashion. In the plate circuit are the coil 30 of the transformer 31, the usual B battery 29, and one end of the filament of the tube. Another coil 34 of the transformer 31, is connected between the grid of the vacuum tube 35, and one end of the filament of the same tube. Another coil 33 of the transformer 31, is connected between the plate of the tube, and the B battery 29ª. A lead is connected from one pole of the B battery to one end of the filament, in the conventional fashion. Another coil 32 of the transformer 31, is connected directly to the loud speaker element 6. The operation of the apparatus is as follows: The E. M. F. generated by the difference of temperature between thermocouples 8 and 9 causes a change in the potential of the grid of the tube 27. This causes a corresponding and magnified change in the direct current flowing in the plate circuit of the tube and consequently in the coil 30 of the transformer 31. This in turn causes a change in the flux in the core of the transformer 31. The coils 33 and 34, tube 35, battery 29ª and battery 28ª constitute a generator of electrical oscillations. The frequency of the oscillations generated will be dependent on the saturation of the core of the transformer 31. Thus a change in E. M. F. generated by thermo-couple 8 will cause a change in the frequency of the oscillations generated in the oscillatory circuit described above. The oscillations generated will be picked up by the coil 32 of the transformer 31, and converted into mechanical oscillations by means of the loud speaker element 6.

The circuit shown in Figure 11 is that of the generators shown in Figures 3 and 8. It is seen that the circuit is that of a conventional vacuum-tube oscillation generator, the frequency of the oscillations being made variable by the variable condenser 15. In the case of the measurement of pressure, a cell such as that shown in Figure 5 constitutes the element 15. In this a heavy metal plate 16 is kept separated from a thin metal diaphragm 18 by means of an insulating ring 17. An increase in pressure will cause a deflection of the diaphragm 18 and thus bring portions of it closer to the plate 16. If wires are connected respectively to the plate 16 and diaphragm 18, the unit will function as a variable condenser. It is understood that the member 18 forms part of the outer wall of the cartridges 12ª and 12ᵈ. In the case of the apparatus shown in Figure 8, the tilt of the pendulum 29 relative to its support 38 may be made to alter the capacity of a member 15 in the circuit shown in Figure 11, and thus cause a change in generated frequency. As before, this electrical oscillation is converted into a mechanical one by means of the loud speaker element 6.

The means of detecting the oscillations is shown in Figure 12. Here the supporting member 2 is allowed to make frictional contact with a semi-flexible member 44, resting on a support 45. The member 44 may be made of metal. Between the member 44 and support 45 is placed a microphone element 46 of conventional type, which is in turn connected to an electrical frequency measuring apparatus shown schematically at 14. The frequency measuring apparatus 14, may be any one of a number of conventional frequency measuring devices of the type used by connection to a microphone to measure the frequency of the sound waves received by the microphone. Typical of the conventional frequency measuring devices used in the art for such purposes are those shown, for example in "Architectural Acoustics" by Knudsen, John Wiley and Sons, New York, 1932, pages 26 to 31, inclusive. A standard commercial instrument which may be used as frequency measuring apparatus 14 is the type 760-A sound analyzer or the type 636-A wave analyzer made by the General Radio Company, of Cambridge, Mass., for measuring the component frequencies in a sound wave. Other commercial instruments are available for the same purpose. In cases where it is desired to measure two physical quantities simultaneously, a modulated wave form is used as shown in Figure 13. Here, one frequency is determined by one of the quantities being measured, the other frequency being determined by the other quantity. Thus the method of making simultaneous measurement of more than one physical quantity would comprise the steps of generating a first wave, causing the frequency of the wave to be altered as a known function of the magnitude of one physical quantity, of generating a second wave, and causing the frequency of the second wave to be altered as a known function of the magnitude of another physical quantity, superposing one wave upon the other to produce a modulated wave, conducting the modulated wave to a remote point, and measuring characteristics of the components of the modulated wave. Thus the simultaneous measurement of temperature and pressure, or temperature and electrical properties, or any other two quantities, may be made. This factor is of importance in cases where the taking of measurements involves the suspension of drilling activities. At such times the cost of maintaining the drilling equipment and crew idle may amount to serious proportions.

The method of combining the frequencies in Figure 9, and of separating the individual frequencies as received in electrical form from microphone 46 are very familiar in the electrical and communications arts, and will not be treated in detail here. The patent to Hutin et al., No. 838,545 dated December 18, 1906, shows the typical fashion of combination and segregation of frequencies.

In cases where it is desired to measure electrical properties, the circuit shown in Figure 10 is employed, the thermo-couples 8 and 9 being removed and the elements 20 and 21 shown in Figure 6 being substituted and being connected at the points in the circuit 23 and 24.

It is obvious that various changes may be made without departing from the scope and spirit of the invention. Thus the element 1 may be used to take measurements of temperature, pressure, and electrical properties, in deep bodies of water. By means of the apparatus shown in Figure 4, the electrical resistivity and, therefore, the salinity of ocean water may be conveniently measured at great depths. It is further obvious that the method may be used in meteorological work, where a balloon or kite is sent aloft carrying with it sound generators, the frequency of the emitted sound being made proportional to the physical quantity it is desired to measure. This sound may be conveyed to the earth either through a fine metal filament or through air. In the latter case any one of the numerous sensitive devices for detecting sounds in air may be used.

It is further obvious that different types of generators than that described may be used. Thus a vibrating reed may be used for the measurement of temperature, a means being employed to keep the reed vibrating, the natural frequency of the reed being altered by the temperature.

It is further obvious that the sound generated by the generator may be transmitted through the fluid medium in which the generator is immersed. In many cases the cartridge with its enclosed generator will be immersed in liquid. This is particularly true of the modifications of the apparatus shown in Figures 3, 4, and 9. In such cases the sound of mechanical vibrations may be conducted upwards through the liquid, and may be detected and measured at the surface. Where a metallic casing or metallic drill stem exists in a bore-hole under investigation, either may be used to convey the sound or mechanical vibrations.

It is further obvious that the pick-up device for detecting the sound may be modified. Thus if a member such as 2 is used the wheel 3 may itself be made the pick-up by being mounted on suitably sensitive supports. Alternatively, a coil may surround the wire and the oscillation in the latter be detected by the magnetostrictive effect.

It is further obvious that electric circuits other than those shown in Figures 10 and 11 may be used to generate the mechanical vibrations or sound.

It is further obvious that the frequency indicating apparatus 14 may be designed to furnish a continuous record of the frequency of the sound detected by the pick-up member 13.

Reference is made to the applicant's copending application Serial No. 108,312, filed October 29, 1936, for "Method and Apparatus for Taking Physical Measurements in Boreholes" and to his Patent No. 2,421,423, which contain claims addressed to subject matter disclosed but not claimed herein.

I claim:

1. In apparatus for surveying a well drilled into the earth, the combination of first electrical exploring means adapted to be lowered into a well for providing a continuous current signal a characteristic of which varies as a function of a subject to be investigated in a well, second electrical exploring means movable with said first exploring means for providing a second signal representative of another subject of interest in a bore hole, first electrical oscillator means movable with said exploring means and having a tuned circuit including inductance means provided with a magnetically saturable core, winding means for said core connected to receive said continuous current signal so as to vary the flux density in the core and thereby modulate the frequency of the output signal from said first oscillator means in accordance with variations in said characteristic of the continuous current signal, second electrical oscillator means, means for modulating the frequency of the signal output of said second oscillator means as a function of said second signal, and means for transmitting a signal having frequency components that are functions of the modulation components in the outputs of said first and second oscillator means to the surface.

2. In apparatus for surveying a well drilled into the earth, the combination of thermocouple means adapted to be lowered into a well to provide a continuous current signal varying as a function of temperature in the well, pressure responsive means mounted in fixed relation to said thermocouple means and movable therewith, first electrical oscillator means having a tuned circuit including inductance means provided with a magnetically saturable core, winding means for said core connected to receive said continuous current signal so as to modulate the frequency of the signal output of said first oscillator means in accordance with variations in the bore hole temperature, second electrical oscillator means, means for modulating the frequency of the signal output from said second oscillator means as a function of the response of said pressure responsive means, means for converting the modulated signal outputs of said first and second oscillator means to correspondingly modulated mechanical vibrations, means for transmitting said modulated vibrations to the surface, and indicating means responsive to the modulation components of said modulated vibrations.

SHELLEY KRASNOW.

REFERENCES CITED

The following references are of record in the file of this patent:

UNITED STATES PATENTS

| Number | Name | Date |
|---|---|---|
| 122,437 | Chester | Jan. 2, 1872 |
| 1,745,714 | Reynolds | Feb. 4, 1930 |
| 1,913,511 | Reynolds | June 13, 1933 |
| 1,928,971 | Dillon et al. | Oct. 3, 1933 |
| 1,991,658 | Clark et al. | Feb. 19, 1935 |
| 1,999,215 | Smith | Apr. 30, 1935 |
| 2,014,518 | Beverage | Sept. 17, 1935 |
| 2,018,080 | Martienssen | Oct. 22, 1935 |
| 2,038,046 | Jakosky | Apr. 21, 1936 |
| 2,144,215 | Beverage | Jan. 17, 1939 |
| 2,190,950 | Potapenko | Feb. 20, 1940 |
| 2,225,668 | Subkow | Dec. 28, 1940 |
| 2,317,304 | Schlumberger | Apr. 20, 1943 |
| 2,421,423 | Krasnow | June 3, 1947 |
| 2,425,868 | Dillon | Aug. 19, 1947 |